Feb. 3, 1970                     D. V. MANCINI                     3,492,785
                    AUTOMATIC CUP FILLING AND LIDDING APPARATUS
Filed Dec. 20, 1965                                              6 Sheets-Sheet 1

Inventor
Derek Mancini
By Wallenstein, Spangenberg, Hattis & Strampel
Attys

United States Patent Office 3,492,785
Patented Feb. 3, 1970

3,492,785
AUTOMATIC CUP FILLING AND LIDDING APPARATUS
Derek V. Mancini, Toronto, Ontario, Canada, assignor to Portion Containers, Inc., Chicago, Ill., a corporation of Illinois
Filed Dec. 20, 1965, Ser. No. 515,011
Int. Cl. B65b *3/32, 7/28, 43/50*
U.S. Cl. 53—282      15 Claims

ABSTRACT OF THE DISCLOSURE

An apparatus for automatically filling outwardly rimmed cups with a flowable product and applying lids to the filled cups comprises an intermittently driven turntable, a cup supply station for supplying cups to the turntable, a cup filling station for filling the cups with measured amounts of the flowable product, a lid applying station for applying lids to the filled cups, and a cup discharge station for discharging filled and lidded cups from the turntable.

---

The principal object of this invention is to provide an improved apparatus for automatically filling cups with a flowable product, such as, for example, milk, cream, mustard, catsup, salad dressing, sauces, jams, jellies and the like, and applying lids to the filled cups for ready handling of the same, wherein said apparatus is simple in construction and foolproof in operation, is inexpensive to manufacture and assemble, is readily cleaned and sterilized, is capable of being readily taken down or disassembled for cleaning and sterilizing purposes, and constitutes a novel combination of elements which are structurally and functionally interrelated for accomplishing the foregoing.

Briefly, the apparatus includes an intermittently rotatable turntable having a plurality of circumferentially arranged cup receiving openings in the periphery thereof. A cup supply station is located at one position with respect to the turntable and it includes a magazine for holding a stack of nested cups and a cup feeding means for removing and feeding cups one at a time from the stack of nested cups into the cup receiving openings in the turntable. A cup filling station is located at another position with respect to the turntable and it includes a feeding nozzle for feeding the flowable product into the cups carried by the turntable and a metering pump for intermittently supplying measured amounts of the flowable product to the nozzle. A lid applying station is located at a further position with respect to the turntable and it includes a magazine for holding a stack of lids, an intermittently operated carrier for feeding lids one at a time from the stack of lids onto the filled cups carried by the turntable, and an intermittently operated plunger for pressingly securing the lids to the filled cups. A cup discharge station is located at still another position with respect to the turntable for raising and laterally discharging the lidded filled cups from the cup receiving openings in the turntable. Power operated means are also provided for operating the turntable, cup feeding means, metering pump, carrier and plunger in timed relation.

Further objects of this invention reside in the constructions of the various parts of the apparatus and in the cooperated relationships between such parts for affording the improved apparatus of this invention.

Other objects and advantages of this invention will become apparent to those skilled in the art upon reference to the accompanying specification, claims and drawings in which:

Figures 1, 2, 3:
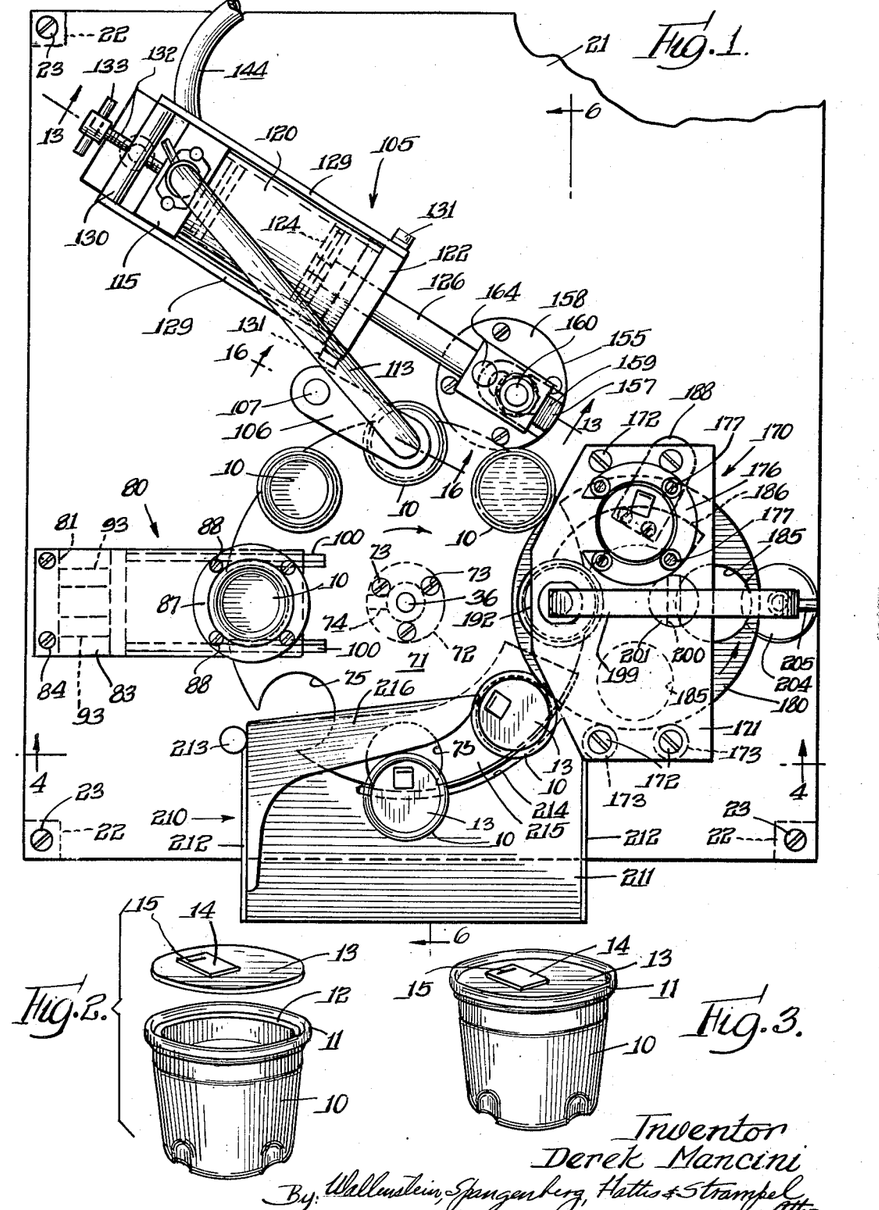
FIG. 1 is a top plan view of the automatic cup filling and lidding apparatus of this invention.
FIG. 2 is an exploded perspective view of the outwardly rimmed cup and the lid to be applied thereto.
FIG. 3 is a perspective view of the outwardly rimmed cup with the lid applied thereto.

Referring more particularly to FIGS. 2 and 3, the cups to be filled and lidded by the apparatus of this invention include side walls 10 and a bottom wall not shown, the side walls 10 being frusto-conical in configuration and being provided at their upper end with outwardly extending rims 11 which are in turn provided with an internal recess and shoulder 12 for receiving a lid 13. The cups 10 may be formed of a synthetic plastic material or the like and the lids 13 may be formed of paper or the like. The lids 13 are press-fit into the recess 12 of the cups after the cups are filled and to facilitate removal of the lids 13 from the cups 10, the lids 13 may be provided with tabs 14 secured in place on the lids 13 by staples or the like. The cups may be of any suitable size but for purposes of illustration herein, they are shown as cups of the creamer size.

Figure 4:
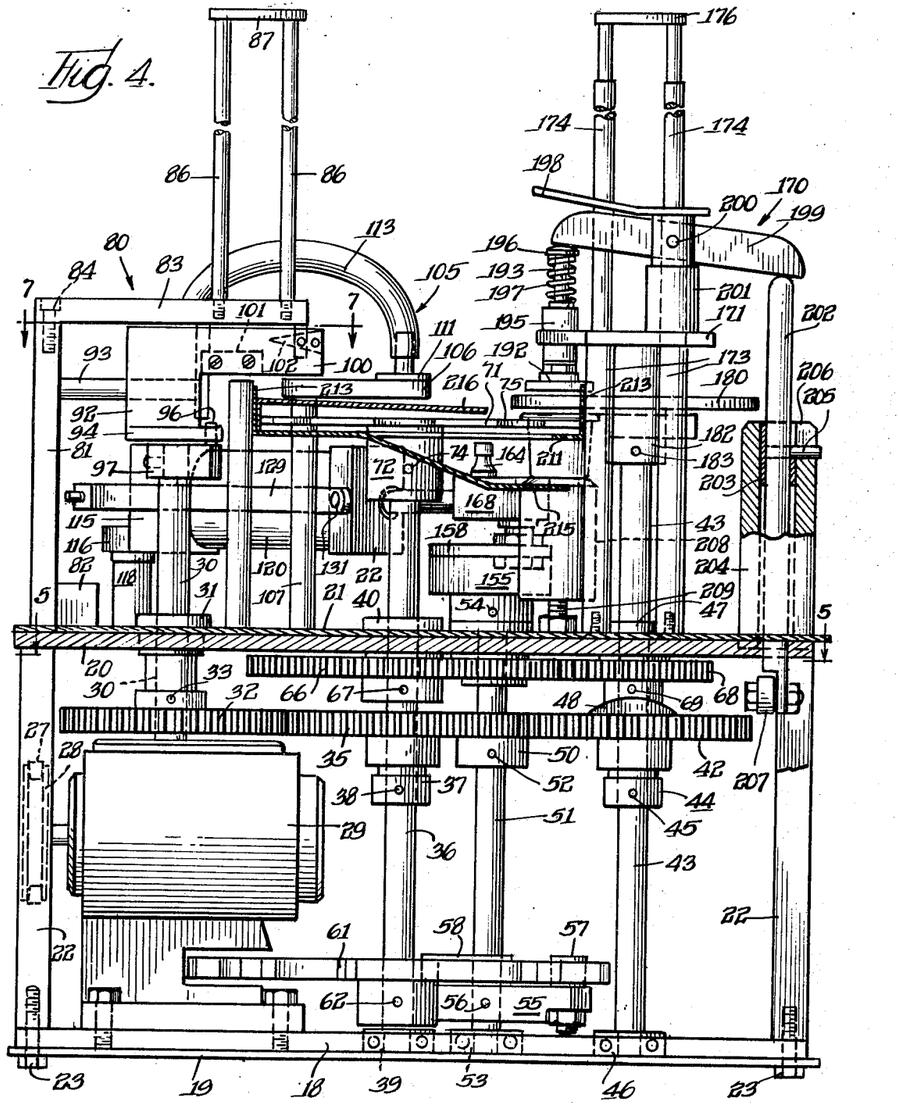
FIG. 4 is a vertical sectional view through the apparatus taken substantially along the line 4—4 of FIG. 1.
Figure 5:
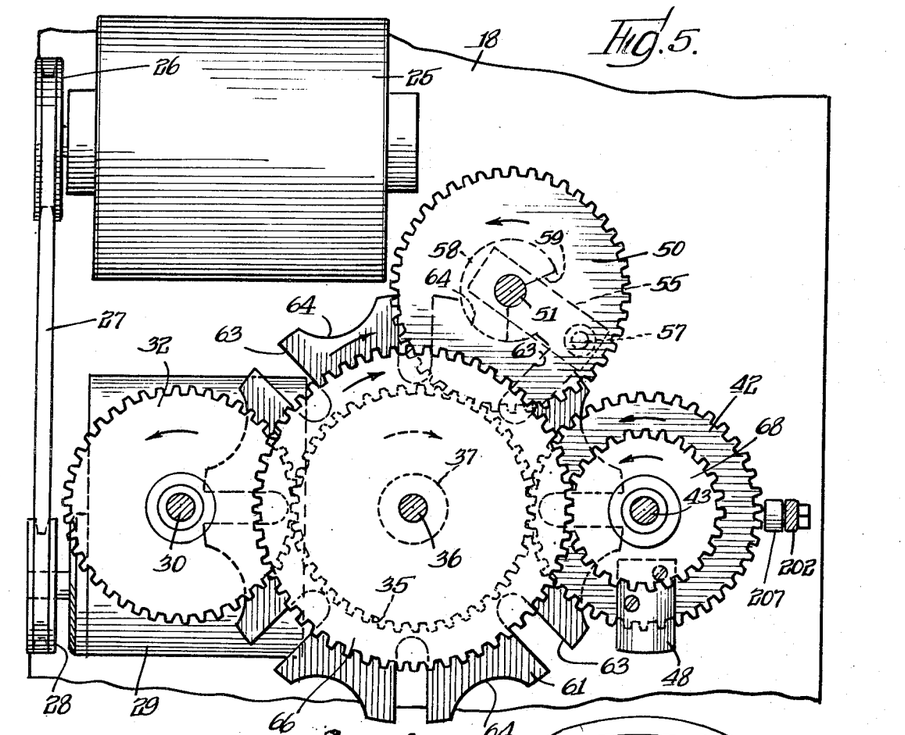
FIG. 5 is a horizontal sectional view through the apparatus taken substantially along the line 5—5 of FIG. 4.

Referring now to FIGS. 1, 4 and 5, the apparatus includes a bed plate 18, having a covering plate 19 and a base plate 20 having a cover plate 21, the plates 18 and 20 preferably being formed of aluminum for decreasing weight and the plates 19 and 21 being formed of stainless steel or the like which is preferable in connection with the use of the apparatus for food processing. The bed plates 18 and 19 and the base plates 20 and 21 are secured together in spaced apart relation by vertical corner posts 22 held in place by screws 23. The volume between the bed plates and the base plates is preferably closed with side plates not shown, the side plates also being preferably formed from stainless steel of the like.

An electric motor 25 is suitably secured to the bed plate 18 and it drives a pulley 26 which is connected by a belt 27 to a pulley 28 for operating a gear reducer 29 also suitably secured to the bed plate 18. The gear reducer 29 drives a vertically arranged shaft 30 which is journaled for rotation in a bearing 31 carried by the base plate 20. A gear 32 is secured to the shaft 30 by a pin 33 or the like so as to be rotated when the shaft 30 is rotated. The gear 32 is rotated in a counterclockwise direction as illustrated by the arrow in FIG. 5.

The gear 32 meshes with a gear 35 which is rotatably mounted on a vertical shaft 36, the gear 35 being mounted in proper longitudinal position on the shaft 36 by a collar 37 secured to the shaft 36 by a pin 38 or the like. The shaft 36 is rotatably mounted in a bearing 39 carried by the bed plate 18 and a bearing 40 carried by the base plate 20. Thus, the shaft 36 is rotatably mounted and the gear 35 is rotatably mounted with respect to the shaft 36. The gear 35 rotates in a clockwise direction as indicated by the broken arrow in FIG. 5. The gear 35 meshes with a gear 42 which is rotatably mounted on a vertical shaft 43, the gear 42 being held in proper longitudinal position on the shaft 43 by a collar 44 secured to a shaft 43 by a pin 45 or the like. The shaft 43 is journaled for rotation by a bearing 46 carried by the bed plate 18 and a bearing 47 carried by the base plate 20. Thus, here also, the shaft 43 is rotatably mounted and the gear 42 is rotatably mounted with respect to the shaft 43. The gear 42 carries a cam 48 for operating a plunger upon each rotation of the gear 42 as will be explained in more detail hereafter.

The gear 35, in addition to meshing with the gear 42, also meshes with a gear 50 which is secured to a vertical shaft 51 by a pin 52 or the like. The vertical shaft 51 is journaled for rotation by a bearing 53 carried by the bed plate 18 and by a bearing 54 carried by the base plate 20. The gears 42 and 50 which mesh with gear 35 are rotated in a counterclockwise direction as indicated by the arrows. Thus, the gears 32, 35, 42 and 50 are all continuously rotated by the electric motor 25 through the gear reducer 29. A crank 55 is secured to the vertical shaft 51 by a pin 56 or the like so as to rotate with the shaft 51, the crank 55 being provided with an upwardly extending pin 57 and also with an upwardly extending lock member 58. The lock member 58 is generally circular but is provided with a recess 59 as shown more clearly in FIG. 5.

A Geneva wheel 61 is secured to the vertical shaft 36 by means of a pin 62 or the like and is provided with a plurality of slots 63 for receiving the pin 57 on the crank 55, and with a plurality of circular recesses 64 for cooperating with the circular lock member 58. With the crank 55 in the position shown in FIG. 5, the lock member 58 prevents rotation of the Geneva wheel 61. As the crank 55 is rotated in the direction indicated by the arrow, the Geneva wheel 61 remains stationary, but when the pin 57 enters a slot 63 in the Geneva wheel 51, the pin 57 causes the Geneva wheel 61 to be rotated, this being made possible by reason of the recess 59 in the lock member 58. When the pin 57 leaves the slot 63, rotation of the Geneva wheel 61 is stopped and it is locked in the new position by the lock member 58. In this way, the Geneva wheel is intermittently rotated and advanced in the direction indicated by the arrow in FIG. 5 as the crank 55 driven by the gear 50 is continuously rotated.

A gear 66 is secured to the vertical shaft 36 by a pin 67 or the like and it is intermittently advanced in the direction indicated by the arrow in FIG. 5 as the Geneva wheel 61 is intermittently advanced. The gear 66 meshes with a gear 68 which is secured by a pin 69 or the like to the vertical shaft 43. Thus, the gear 68 and the shaft 43 to which it is secured is intermittently advanced in the direction indicated by the arrow in FIG. 5, and due to the gear ratio between the gears 66 and 68, the gear 68 and the shaft 43 is intermittently advanced through an angle which is twice the angle through which the gear 66 and the shaft 36 are intermittently advanced by the Geneva wheel 61.

A turntable 71 is secured to a hub 72 by screws 73 or the like and the hub 72 is in turn secured by a pin 74 or the like to the intermittently rotated shaft 36 so as to be intermittently rotated in the direction indicated by the arrow in FIG. 1. The turntable 71 is provided with a plurality of cup receiving openings 75 in the periphery thereof, and for purposes of illustration, 8 such cup receiving openings are provided in the turntable.

A cup supply station is generally designated at 80 and is arranged at one position with respect to the turntable 71. The cup supply station is disclosed in more detail in FIGS. 1, 4 and 7 through 10. It includes a vertical plate 81 which is secured to the base plate 20 through a suitable block 82. Support plate 83 is secured to the top of the vertical plate 81 by screws 84 or the like. The inner end of the support plate 83 is provided with a circular hole 85 which has a diameter corresponding generally to the diameter of the outwardly extending rims 11 of the cups 10. A plurality of guide posts 86 are carried by the support plate 83 circumferentially around the circular opening 85 and extend upwardly therefrom to form a magazine for a stack of nested cups. The upper ends of the posts 86 have an annular ring 87 secured thereto by screws 88, the cups being inserted into the magazine through the opening in the ring 87. Depending downwardly from the support plate 83 is a pair of guide posts 89 and 90 for guiding the cups 10 after they have passed through the circular opening 85 in the support plate 83.

Figures 8, 9, 10:
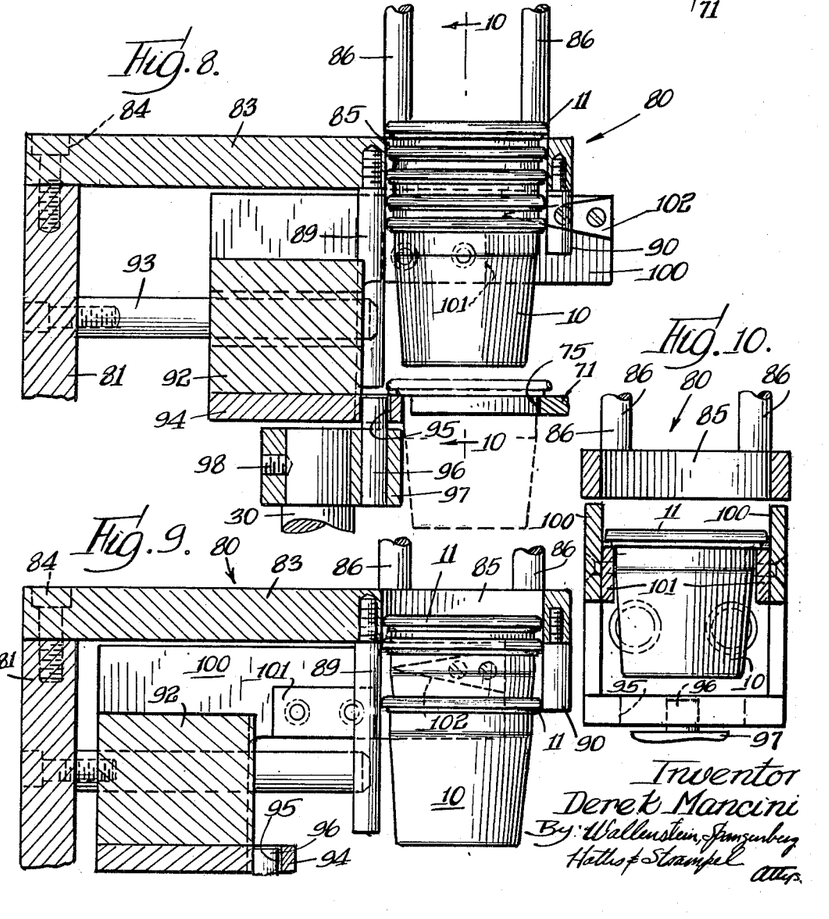
FIG. 8 is a vertical sectional view taken substantially along the line 8—8 of FIG. 7 showing the head of the feeding mechanism in advanced position.
FIG. 9 is a vertical sectional view similar to FIG. 8 but showing the head in retracted position.
FIG. 10 is a vertical sectional view taken substantially along the line 10—10 of FIG. 8.

A head 92 is slidably mounted beneath the support plate 83 by a pair of posts 93 carried by the vertical plate 81, the head 92 being moved to the advanced position as illustrated in FIG. 8 and retracted position as illustrated in FIG. 9. The head 92 is provided at its bottom with a plate 94 which has a horizontal slot 95 as shown more particularly in FIGS. 8, 9 and 10. This horizontal slot 95 receives a pin 96 carried by a crank 97 which is secured by a set screw 98 or the like to the upper end of the continuously rotating shaft 30. Thus, as the shaft 30 is rotated, the pin 96 operating in the slot 97 operates to reciprocate the head 92 between advanced and retracted positions. The head carries a pair of fingers 100 which extend forwardly from the head on opposite sides of the cups carried by the magazine. A pair of stop shoulders 101 are secured to the fingers 100 adjacent the inner ends of the fingers and a pair of wedges 102 are secured adjacent the outer ends of the fingers 100 above and spaced from the stop shoulders 101. When the head 92 is advanced as illustrated, the stop shoulders 101 engage with the outwardly extending rim 11 of the lowermost cup 10 of the stack of cups in the magazine so as to maintain the same in place. When the head 92 is retracted, the stop shoulders 101 move away from the outwardly extending rim of the lowermost cup 10 and the wedges 102 enter between the outwardly extending rim of the lowermost cup and the outwardly extending rim of the next above cup so as to release the lowermost cup as illustrated in FIG. 9 and to retain the remaining cups in the stack of cups in proper position in the magazine. As the head 92 moves from its retracted position as illustrated in FIG. 9 to its advanced position as illustrated in FIG. 8, the wedges 102 are withdrawn from below the outwardly extending rim of the new lowermost cup and the stop shoulders 101 are moved under the outwardly extending rim of the new lowermost cup so as to maintain it and the remaining cups in the stack in position in the magazine. Thus, as the head 92 is continuously reciprocated, the lowermost cup is released from the stack of cups in the magazine and is deposited in the cup receiving opening 75 in the turntable 71, the intermittent advance of the turntable 71 being timed with respect to the reciprocation of the head 92. In this way, cups are automatically, sequentially fed to the cup receiving openings 75 in the turntable 71 as the turntable 71 is intermittently advanced.

A cup filling station is generally designated at 105 and is shown in more detail in FIGS. 1, 6 and 13 through 17. The cup filling mechanism 105 includes a nozzle member 106 which is secured by a pin 108 or the like to a post 107 carried by the base plate 20, the nozzle member 106 extending over the circumferentially arranged cups in the turntable 71. The nozzle member 106 is provided adjacent its free end with a cylindrical cavity 109 which in turn is provided with downwardly and outwardly extending passages 110 as shown more clearly in FIG. 16. The cavity is releasably closed by a fitting 111 having an annular portion extending into the cavity and an O-ring 112 seals the connection between the fitting 111 and the cavity 109. The flowable product for filling the cups is supplied to the fitting 111 and to the cavity 109 by a tube 113 which may be formed from synthetic plastic or the like. The flowable product so supplied passes through the downwardly and outwardly extending passages 110 so as to be directed primarily against the frusto-conical side walls of the cups 10 carried by the turntable 71. By so doing, foaming of the flowable product as it is directed into the cups 10 is largely minimized. If foaming is not a problem, other types of passages may be utilized for directing the flowable product into the cups 10. It is seen that the fitting 111 may be readily releasably removed so as to provide simple cleaning and sterilizing of the nozzle.

Figure 13:
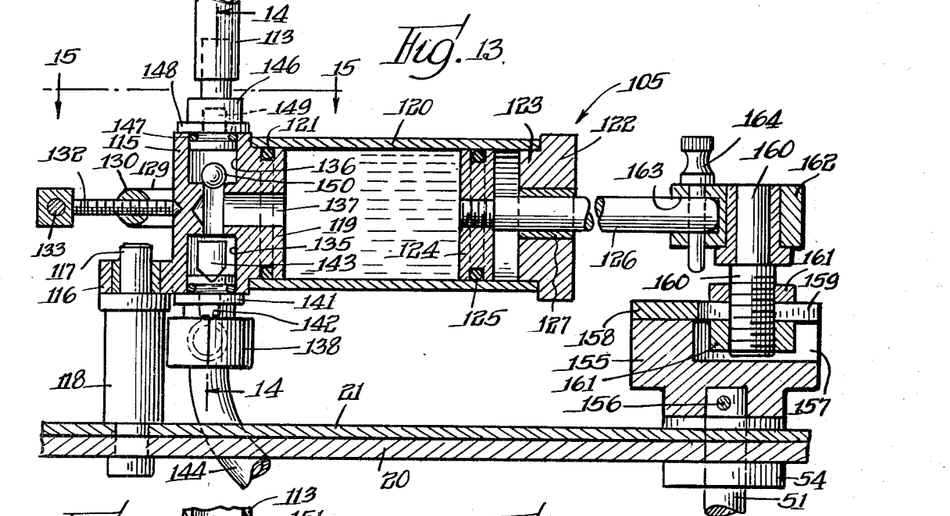
FIG. 13 is a vertical sectional view of a portion of the apparatus taken substantially along the line 13—13 of FIG. 1 and illustrating more particularly the metering pump.
Figures 14, 15, 16, 17:
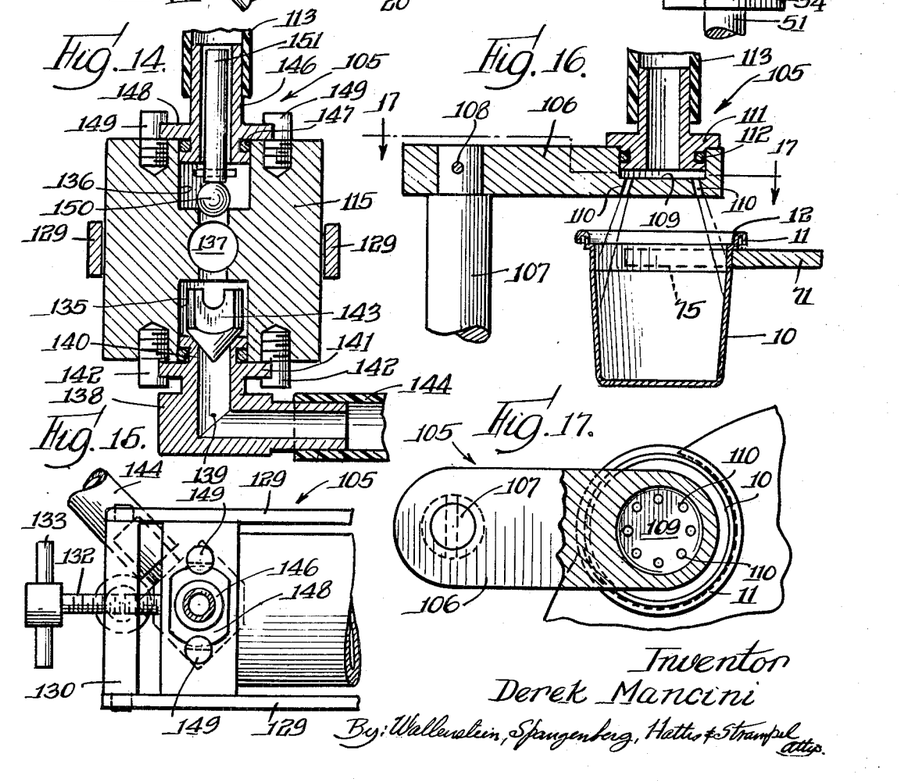
FIG. 14 is a vertical sectional view taken substantially along the line 14—14 of FIG. 13.
FIG. 15 is a horizontal sectional view taken substantially along the line 15—15 of FIG. 13.
FIG. 16 is a vertical sectional view of a portion of the apparatus taken substantially along the line 16—16 of FIG. 1 and illustrating more particularly the nozzle construction.
FIG. 17 is a horizontal sectional view taken substantially along the line 17—17 of FIG. 16.

The cup filling station 105 also includes a metering pump which has a head 115 provided with an ear 116 for pivotally mounting the head 115 on a pin 117 carried by a post 118 secured to the base plate 20. The head 115 is provided with an annular projection 119 for releasably receiving one end of a cylinder 120. An O-ring 121 seals the joint between the annular projection 119 and the cylinder 120. The other end of the cylinder 120 is closed by a closure member 122 having a projection 123 which is received in said other end of the cylinder. A piston 124 is slidably mounted in the cylinder 120 and an O-ring seals the piston 124 to the cylinder 120. The piston 124 is reciprocated by a piston rod 126 which extends outwardly through a bearing 127 in the closure 122. A U-shaped clamping member having side legs 129 and a cross member 130 is pivotally secured to the closure 122 by pins 113. The cross member 130 carries a screw 132 provided with manually manipulatable wing 133. By manipulating the screw 132, the clamp member operates to maintain the head 115, cylinder 120 and closure 122 in assembled relation as illustrated in FIG. 13. The releasing of the clamping member by manipulation of the screw 132 allows the head 115, cylinder 120 and closure 122 to be readily disassembled for cleaning and sterilizing purposes.

The head 115 is provided with aligned inlet and outlet ports 135 and 136 which communicate with a passage 137 communicating with the interior of the cylinder 120. A fitting 138 is provided with an inlet passage 139 and an annular projection which extends into the port 135, the annular projection being sealed in the port 135 by an O-ring 140. The fitting is also provided with a flange 141 which is circularly but which is provided with flattened sides for cooperating with notched pins 142 for releasably securing the fitting 138 in the inlet port 135. When the flattened sides of the flange 141 are adjacent the pins 142 the fitting 138 may be inserted and removed from the inlet port 135. When, however, the fitting 138 is inserted into the inlet port 135 and is then rotated through substantially 90 degrees, the flange 141 is received in the slots in the pins 142 for releasably securing the fitting 138 in position on the head 115. A check valve 143 is arranged within the inlet port 135 and cooperates with a seat on the fitting 138 for allowing flow of the flowable product from the fitting into the inlet port 135 but preventing flow of the product from the inlet port 135 into the fitting. The fitting 138 is connected by a suitable tube, such as a synthetic plastic tube 144, to a source of the flowable product.

In a like manner, the outlet port 136 in the head 115 is provided with a fitting 146 having an annular projection fitting into the outlet port 136. The annular projection is sealed to the outlet port 136 by an O-ring 147. The fitting 146 is also provided with a circular flange 148 having flattened sides for cooperating with notches in pins 149 carried by the head for releasably securing the fitting 146 in place on the head 115 in the manner described above in connection with the fitting 138. A ball check valve 150 is arranged in the outlet port 136 to allow flow of the flowable product from the cylinder 120 into the outlet fitting 146 and to prevent flow of the product from the fitting into the cylinder. To provide positive action of the ball check valve 150 a small rod 151 is arranged in the fitting 146 for engaging the ball to maintain it on its seat. The rod 151 is provided with a transverse pin for preventing the same from being forced into the tube 113 which connects the metering pump to the nozzle member 106.

A crank 155 is secured by a pin 156 or the like to the upper end of the continuously rotating shaft 51 so as to be rotated thereby. The crank 155 is provided with a radially extending slot 157 and has an upper plate 158 secured thereto which is also provided with a slot 159 in alignment with the slot 157. A pin 160 extends through the slot 159 and is adjustably secured in the slot 159 by lock nuts 161 engaging the plate 158. By manipulating the lock nuts 161, the pin 160 may be adjustably positioned at any desired position in the slot 159 so as to provide desired radii of gyration of the pin 160. The pin 160 rotatably carries a bearing 162 which is provided with a hole 163 for releasably receiving the outer end of the piston rod 126. A pin 164 extending through holes in the bearing 162 and the piston rod 126 releasably lock the piston rod to the bearing 162. As the crank 155 is continuously rotated, the piston rod is reciprocated by the pin 160, the reciprocation of the piston 124 being permitted by the mounting of the head 115 on the pin 117. The extent of the reciprocation of the piston and hence the amount of the flowable product upon each reciprocation of the piston may be adjusted by adjusting the position of the pin 160 in the slot 159. Since the pump is a positive displacement type pump, metered amounts of the flowable product are delivered to the nozzle member 106 on each reciprocation of the piston 124 and the amount of the flowable product for each reciprocation of the piston 124 may be adjusted as desired. The pump may be completely disassembled for cleaning and sterilizing purposes which adapts the pump for use in delivering measured amounts of a flowable food product to the cups carried by the turntable 71. The piston 124 is reciprocated in timed relation with the intermittent advancement of the turntable 71.

The lid applying station of the apparatus is generally designated at 170 and it is shown in more detail in FIGS. 1, 4, 11 and 12. It includes a plate 171 which is secured by screws 172 to posts 173 which in turn are secured to the base plates 20, 21. The plate 171 is provided with a circular opening 178 which has a diameter corresponding generally to the diameter of the lids 13 and extending above the plate 171 are a plurality of posts 174 circumferentially arranged around the circular opening 178. A top arcuate member 176 is secured to the tops of the posts 174 by screws 177 concentrically with the posts 174, and posts 175 extend downwardly from the plate 171. The top member 176, the posts 174 and 175 and the circular opening 178 in the plate 171 form a magazine for a stack of lids 13.

Arranged below the plate 171 and above the turntable 71 is a carrier 180, the carrier 180 being secured by screws 181 to a hub 182 which in turn is secured by a pin 183 to the upper end of the intermittently operated shaft 43. Thus, as the shaft 43 is intermittently rotated, the carrier 180 is also intermittently rotated in the direction indicated by the arrow in FIG. 1. The underside of the carrier 180 is provided with an annular slot 184 and the distance between the upper wall of the slot and the upper surface of the carrier corresponds substantially to the thickness of a lid 13. The carrier 180 is also provided with a plurality of openings 185 therethrough, the openings 185 being circumferentially arranged in the carrier 180 and concentrically with the annular slot 184. An arcuate member 186 is arranged in a portion of the annular slot 184 and is held in place therein by screws 187 carried by a plate 188 which is secured by a pin 189 to a post 190 suitably carried by the base plate 20. The arcuate member 186, which may be formed of nylon or the like, extends from below the lid magazine to a point adjacent a position wherein the lids are forced onto the cups as more clearly illustrated in FIG. 12. The openings 185 overlie the cup receiving openings 75 where the carrier 180 is superimposed over the turntable 71. The arcuate member 186 maintains the stack of lids in place in the magazine and operates to support the lowermost lid of the stack in an opening 185 of the carrier as it is carried around to the point where the lid is forced onto the cup. When the lid arrives at that position, a filled cup is advanced by the turntable 71 to that same position so that the lid may be pressed into the filled cup.

Figure 11:
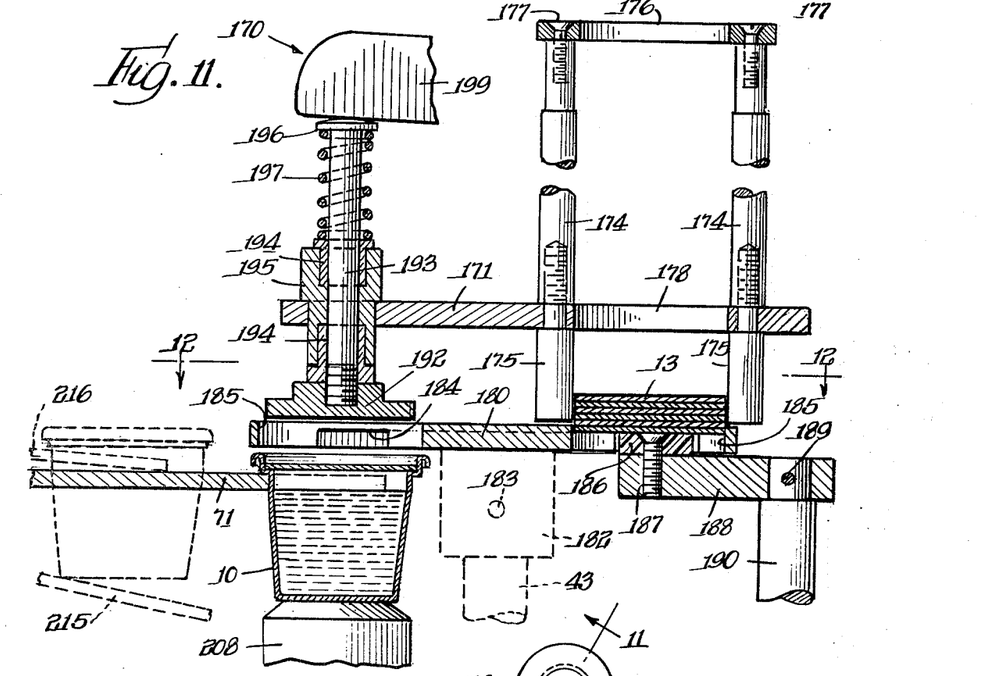
FIG. 11 is a vertical sectional view through a portion of the apparatus taken substantially along the line 11—11 of FIG. 12 and illustrating more particularly the lid applying station.
Figure 12:
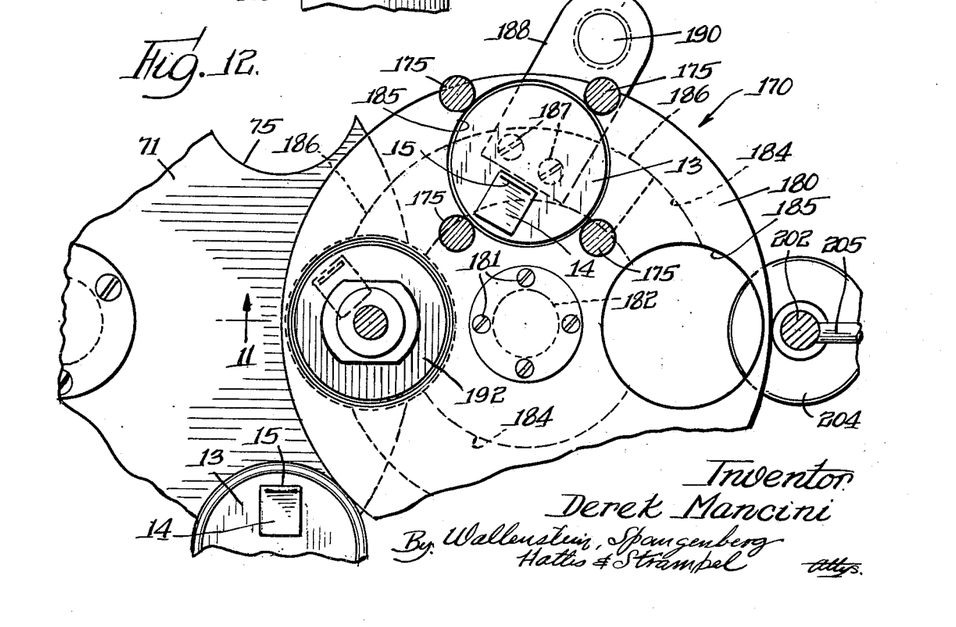
FIG. 12 is a horizontal sectional view taken substantially along the line 12—12 of FIG. 11.

The means for pressing the lids onto the cups includes a circular foot 192 carried by a plunger 193 which is mounted for sliding movement in bearings 194 carried by a sleeve 195 which in turn is secured in a hole in the plate 171. The upper end of the plunger 193 is provided with a head 196 and a spring 197 interposed between the head 196 and the upper bearing 194 maintains the plunger 193 and hence the foot 192 in elevated position as illustrated in FIG. 11. The plunger 193 is intermittently downwardly moved by one end of a lever 199 which is pivoted at 200 to a support 201 carried by the plate 171. The other end of the lever 199 is engaged by a plunger 202 slidably mounted in a bearing 203 carried in a sleeve 204 which in turn is suitably secured to the base plate 20. The plunger 202 carries a pin 205 which is slidable in a slot 206 to prevent rotation of the plunger 202. The lower end of the plunger 202 is provided with a roller 207 which is adapted to be engaged by the cam 48 on the continuously rotating gear 42.

When the cam 48 engages the roller 207, the plunger 202 is forced upwardly to force the plunger 193 downwardly for causing the foot 192 to force the lid 13 into the recess 12 of the filled cup 10. When the cam 48 disengages the roller 207, the spring 197 raises the plunger 193 and through the lever 199 causes the plunger 205 to be pushed downwardly to a point where the pin 205 engages the bottom of the slot 206 in the member 204. Thus, each time that the continuously operating gear 42 makes a complete revolution, a lid is pressed into place on the filled cup by the foot 192. Arranged below the turntable 71 and in alignment with the foot 192 is a backstop 208 which is adjustably carried by a screw 209 suitably secured to the base plate 21. The backstop 208 is adapted to be engaged by the filled cup 10 when the lid 13 is pressed in place by the foot 192, so as to reinforce the cup 10 and to absorb the pressing load afforded by the foot 192 so that the pressing load will not be directly applied to the turntable 71 through the rim 11 of the cup. A guard 198 is secured above the lever 199 adjacent the plunger 193 so as to prevent inadvertent manual depression of the plunger 193.

Figure 6:
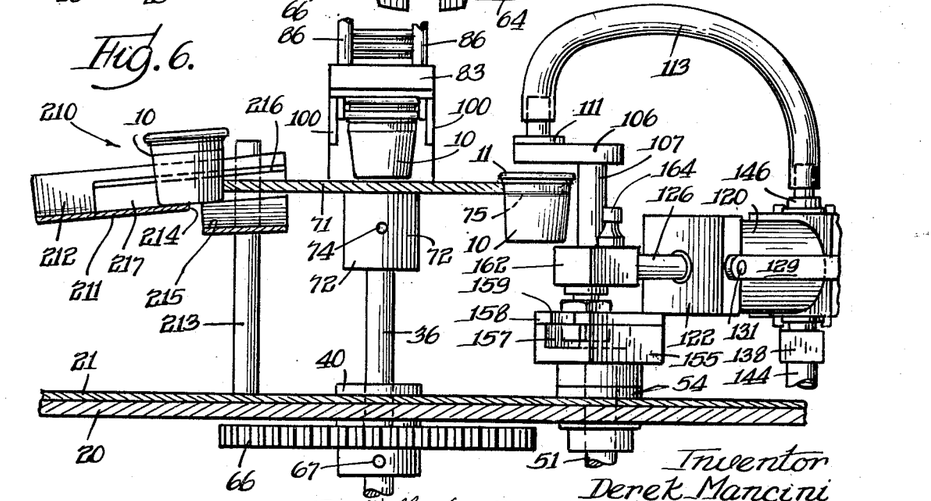
FIG. 6 is a vertical sectional view through a portion of the apparatus taken along the line 6—6 of FIG. 1 and showing more particularly the filling station and the discharge station.
Figure 7:
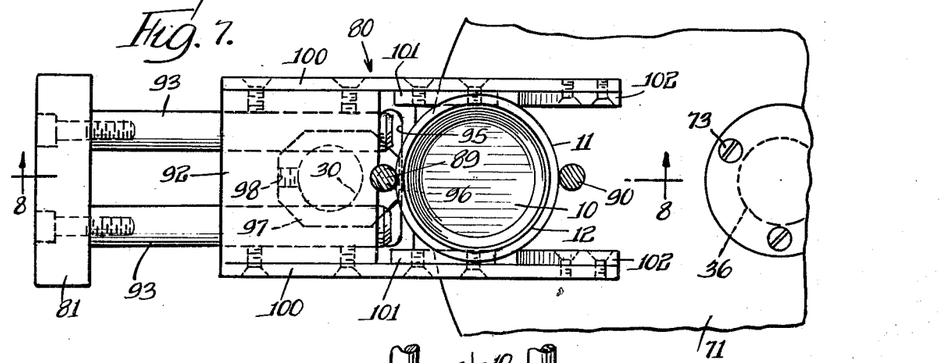
FIG. 7 is a horizontal sectional view through a portion of the apparatus taken substantially along the line 7—7 of FIG. 1 and showing more particularly the cup supply station.

The apparatus also includes a cup discharge station which is generally designated at 210 and which is shown in more detail in FIGS. 1, 5, and 6. The discharge station 210 includes a chute 211 for receiving and discharging the lidded filled cups, it being provided with upwardly extending flanges 212 and it being held in place by one of the posts 173 and a post 213 suitably carried by the base plate 20. The chute 211 is provided with an arcuate slot 214 to form an arcuate ramp 215. The free end of the ramp 215 extends below the lidded filled cups as they are carried by the turntable 71 from between the foot 192 and the backstop 208. As the turntable is intermittently rotated, the ramp 215 is engaged by the bottoms of the cups and operates to raise the cups in the cup receiving openings 75. A curved finger 216 having a depending flange 217 suitably secured to an upstanding side 212 of the chute 211 engages the side walls of the cups 10 as they are advanced by the turntable 71 and as they are lifted by the ramp 215 upwardly in the cup receiving openings 75 for the purpose of discharging the lidded filled cups from the cup receiving openings 75 onto the chute 211.

In operation, with the parts in the position illustrated, the Geneva wheel 61 and the turntable 71 and the carrier 180 are locked in position, the head 92 of the cup feeding station 80 is advanced and a cup has been supplied to the cup receiving opening in the turntable 71, a cup is arranged below the nozzle member 106 of the cup filling station 105, the piston 124 of the metering pump is in its retracted position at the end of its suction stroke, a lid has been arranged by the carrier 180 over a filled cup in the lid applying station, and a lidded filled cup is about to be discharged from the turntable at the cup discharge station.

As the gears 32, 35 and 42 are continuously rotated from these positions of the parts, the turntable 71 and carrier 180 remain locked in position, the head 92 is retracted to start the cycle for supplying another cup from the magazine, the piston 124 of the metering pump is advanced to deliver a metered amount of flowable product through the nozzle member 106 to the cup thereunder, and the cam 48 engages and disengages the plunger roller 207 to force a lid onto the filled cup at the lid applying station.

Upon continued rotation of the gears 32, 35 and 42, the Geneva wheel 61 is unlocked and the pin 57 advances the Geneva wheel to advance the turntable 71 and the carrier 180, the head 92 is advanced to supply another cup to the turntable 71, the piston 124 of the metering pump is retracted to draw in another metered amount of flowable product, another lid is advanced by the carrier 180 over a filled cup, and a lidded filled cup is discharged at the cup discharge station. The parts then reassume the initial positions described above and are ready for another cycle of operation.

The parts above the base plate 20 are preferably made of stainless steel so that they may readily be cleaned and sterilized which particularly adapts the apparatus for handling food products, and, also, for this purpose, the parts, including those of the metering pump and the nozzle, may be readily disassembled. Also, as is clear from the foregoing specification, the various parts stucturally and functionally cooperate with each other for providing an improved apparatus for automatically filling cups with a flowable product and applying lids to the filled cups.

While for purposes of illustration one form of this invention has been disclosed, other forms thereof may become apparent to those skilled in the art upon reference to this disclosure and, therefore, this invention is to be limited only by the scope of the appended claims.

The embodiments of the invention in which an exclusive property or privilege is claimed are defined as follows:

1. An apparatus for automatically filling outwardly rimmed cups with a flowable produce and applying lids to the filled cups, comprising a horizontally arranged and intermittently rotatable turntable having a plurality of circumferentially arranged cup receiving openings in the periphery thereof, a cup supply station at one position with respect to the turntable and including a cup magazine above the turntable in alignment with the circumferentially arranged cup receiving openings in the turntable for carrying a stack of the outwardly rimmed cups in nested relation and continuously driven cup feeding means between the cup magazine and the turntable for removing and feeding the outwardly rimmed cups one at a time from the stack of cups into the cup receiving openings in the turntable, a cup filling station at another position with respect to the turntable and including a feeding nozzle above the turntable in alignment with the circumferentially arranged cup receiving openings in the turntable for filling the cups one at a time with the flowable product and a continuously driven metering pump for intermittently supplying measured amounts of the flowable product to the nozzle, a lid applying station at a further position with respect to the turntable and including a magazine above but offset from the turntable for carrying a stack of lids, an intermittently driven rotatable carrier between the lid magazine and the turntable and having a plurality of circumferentially arranged lid receiving openings in alignment with the lid magazine and the circumferentially arranged cup receiving openings in the turntable for removing and feeding the lids one at a time from the stack of lids onto the filled cups in the cup receiving openings in the turntable and a single intermittently operated plunger above the turntable in alignment with the circumferentially arranged cup receiving openings in the turntable for engaging the lids and pressingly securing them to the filled cups, a cup discharge station at still another position with respect to the turntable and including means for raising the filled and lidded cups in the circumferentially arranged cup receiving openings in the turntable and laterally discharging the same from said openings, and driving means for operating said turntable, said cup feeding means, said metering pump, said carrier and said plunger in timed relation.

2. An apparatus for automatically filling cups with a flowable product, comprising a nozzle for feeding the flowable product into the cups, and a metering pump for supplying measured amounts of the flowable product to the nozzle, said metering pump including a head having an annular shoulder, a cylinder having one end removably received over said shoulder and a closure member at its other end, an O-ring sealing said one end of the cylinder with said annular shoulder, a piston reciprocatably mounted in the cylinder and having a piston rod extending through the closure member, an O-ring sealing said piston in said cylinder, a releasable clamping means extending between said head and said closure member for releasably securing said cylinder to said head, inlet and outlet ports in said head communicating respectively with a source of the flowable product and with the nozzle and communicating with the interior of said cylinder, check valves in said ports for controlling the supply of the flowable product from said source into the cylinder when the piston is retracted and the discharge of the flowable product from the cylinder to said nozzle when the piston is advanced, and means connected to said piston rod for reciprocating said piston between retracted and advanced positions.

3. The apparatus as defined in claim 2 wherein said means connected to said piston rod for reciprocating said piston between advanced and retracted positions is adjustable to vary the extent of reciprocating movement of said piston in said cylinder to vary the measured amount of the flowable product supplied to the nozzle.

4. The apparatus as defined in claim 2 wherein said head is pivotably mounted, and wherein said means for reciprocating said piston between retracted and advanced positions includes a bearing, a connection between the piston rod and the bearing, a pin carrying the bearing, a rotatable crank having a radial slot, end means for radially adjustably securing said pin in the radial slot of the crank for adjustably varying the extent of reciprocating movement of said piston in said cylinder as the crank is rotated to vary the measured amount of the flowable product supplied to the nozzle.

5. The apparatus as defined in claim 2 wherein the connection to the piston rod is a releasable connection.

6. The apparatus as defined in claim 2 wherein a conduit extends between the source of the flowable product and the inlet port of said head and a conduit extends between the outlet port of said head and the nozzle, a releasable connector between the first mentioned conduit and the inlet port of said head to permit exposure of said inlet port and removal of the check valve therefrom, and a releasable connection between the second mentioned conduit and the discharge port of said head to permit exposure of said outlet port and removal of the check valve therefrom.

7. The apparatus as defined in claim 6 wherein an O-ring seals the first mentioned releasable connection on the inlet port of said head, and an O-ring seals the second mentioned releasable connection in the outlet port of said head.

8. An apparatus as defined in claim 2, said nozzle comprising a fixed solid member extending over the cups and having an upwardly extending circular cavity therein and a bottom wall with downwardly and outwardly extending circumferentially arranged passages therein for directing the flowable product from said cavity against the side walls of the cups below said nozzle.

9. An apparatus as defined in claim 8 wherein a conduit extends between the metering pump and the nozzle, a releasable connection between the conduit and the upwardly extending cavity of the nozzle, and an O-ring sealing the releasable connection in the upwardly extending cavity of said nozzle.

10. An apparatus as defined in claim 1 wherein the means of the cup supply station for removing and feeding the outwardly removed cups one at a time from the nested stack of cups into the cup receiving openings in the turntable includes a horizontally reciprocable head between the magazine and the turntable and having a pair of fingers extending on opposite sides of the cups of the stack carried by the magazine, a pair of shoulders carried by the fingers for engaging the outwardly extending rim of the lowermost cup when the head is advanced for retaining the stack of cups in place in the magazine and for disengaging the outwardly extending rim of the lowermost cup when the head is retracted, a pair of wedges carried by the fingers and spaced longitudinally and laterally from and above said shoulders for movement between the outwardly extending rim of the lowermost cup and the outwardly extending rim of the next above cup when the head is retracted for separating the lowermost cup from the next above cup to free the same from the stack and for disengaging the outwardly extending rim of the new lowermost cup when the head is advanced.

11. An apparatus as defined in claim 1 wherein said metering pump of the cup filling station for supplying measured amounts of the flowable product to the nozzle is a readily disassembled pump and comprises a head having an annular shoulder, a cylinder having one end removably received over said shoulder and a closure member at its other end, an O-ring sealing said one end of the cylinder with said annular shoulder, a piston reciprocatably mounted in the cylinder and having a piston rod extending through the closure member, an O-ring sealing said piston in said cylinder, a releasable clamping means extending between said head and said closure member for releasably securing said cylinder to said head, inlet and outlet ports in said head communicating respectively with a source of the flowable product and with the nozzle and communicating with the interior of said cylinder, check valves in said ports for controlling the supply of the flowable product from said source into the cylinder when the piston is retracted and the discharge of the flowable product from the cylinder to said nozzle when the piston is advanced, and a releasable operating connection for the piston rod.

12. An apparatus as defined in claim 1 wherein said nozzle of the cup filling station for filling the cups comprises a fixed solid member extending over the cups and having an upwardly extending circular cavity therein and a bottom wall with downwardly and outwardly extending circumferentially arranged passages therein for directing the flowable product from said cavity against the side walls of the cups below said nozzle.

13. An apparatus as defined in claim 1 wherein the lid applying station further includes a backup member below the turntable in alignment with the plunger to engage and backup the bottoms of the filled cups as the plunger pressingly secures the lids to the filled cups.

14. An apparatus as defined in claim 1 wherein the cup discharge station includes a ramp below the turntable in alignment with the circumferentially arranged cup receiving openings therein for engaging the bottoms of and raising the lidded filled cups in the cup receiving openings, a curved finger engaging the sides of the raised lidded filled cups for laterally discharging the same from said cup receiving openings, and a chute for receiving the discharged lidded filled cups.

15. An apparatus as defined in claim 1 wherein the means for operating said turntable, said cup feeding means, said metering pump, said carrier and said plunger in timed relation includes an electric motor, gearing continuously operated by said electric motor and connected to said cup feeding means and said metering pump for continuously operating the same, a cam operated by said gearing and connected to said plunger for intermittently operating the same, and a Geneva gear mechanism operated by said gearing and connected to said turntable and said carrier for intermittently operating the same.

References Cited

UNITED STATES PATENTS

| | | | |
|---|---|---|---|
| 948,461 | 2/1910 | Strasburger | 53—367 X |
| 1,913,743 | 6/1933 | Borchert | 53—282 |
| 2,492,873 | 12/1949 | Lamb | 141—286 X |
| 2,510,576 | 6/1950 | Herbold | 222—309 |
| 2,969,632 | 1/1961 | Carew et al. | 53—283 |
| 1,083,727 | 1/1914 | Claussen | 221—221 |
| 1,666,008 | 4/1928 | Graffenberger | 221—221 |
| 2,486,194 | 10/1949 | Moser | 141—286 X |
| 2,639,851 | 5/1953 | Duncan | 141—286 |
| 3,289,712 | 12/1966 | Smith | 141—367 X |
| 3,372,715 | 3/1968 | Ashton | 141—387 X |

THERON E. CONDON, Primary Examiner

R. L. SPRUILL, Assistant Examiner

U.S. Cl. X.R.

103—38; 141—173; 221—221; 222—309, 565